(12) United States Patent
Lele et al.

(10) Patent No.: US 11,324,247 B2
(45) Date of Patent: May 10, 2022

(54) FOOD PRODUCTS FOR INFANTS AND BABIES AND METHOD OF MAKING SAME

(71) Applicant: LIL MIXINS, LLC, Philadelphia, PA (US)

(72) Inventors: Meenal Lele, Philadelphia, PA (US); Kriti Seghal, Philadelphia, PA (US)

(73) Assignee: LIL MIXINS, LLC, Philadelphia, PA (US)

( * ) Notice: Subject to any disclaimer, the term of this patent is extended or adjusted under 35 U.S.C. 154(b) by 0 days.

(21) Appl. No.: 17/480,218

(22) Filed: Sep. 21, 2021

(65) Prior Publication Data

US 2022/0000165 A1 Jan. 6, 2022

Related U.S. Application Data

(63) Continuation-in-part of application No. 16/439,885, filed on Jun. 13, 2019, now Pat. No. 11,154,082.

(51) Int. Cl.

| A23L 33/00 | (2016.01) |
|---|---|
| A21D 8/06 | (2006.01) |
| A23C 9/20 | (2006.01) |
| A23C 9/152 | (2006.01) |
| A23L 33/21 | (2016.01) |
| A23L 5/30 | (2016.01) |
| A23L 5/00 | (2016.01) |

(52) U.S. Cl.
CPC ............... *A23L 33/40* (2016.08); *A21D 8/06* (2013.01); *A23C 9/152* (2013.01); *A23C 9/20* (2013.01); *A23L 5/30* (2016.08); *A23L 5/55* (2016.08); *A23L 33/21* (2016.08)

(58) Field of Classification Search
CPC . A23L 33/21; A23L 33/40; A23L 5/30; A23L 5/55; A21D 8/06; A23C 9/20
See application file for complete search history.

(56) References Cited

U.S. PATENT DOCUMENTS

| 233,750 A | 10/1880 | Halvorson |
|---|---|---|
| 1,630,756 A | 5/1927 | Parsons |
| 1,891,887 A | 12/1932 | Clickner |
| 2,139,696 A | 12/1938 | Reynolds |
| 2,699,996 A | 1/1955 | Sargent |
| 2,999,024 A | 9/1961 | Stimpson et al. |
| 3,028,245 A | 4/1962 | Mink et al. |
| 3,060,038 A | 10/1962 | Mancuso et al. |
| 3,062,665 A | 11/1962 | Peebles |
| 3,077,411 A | 2/1963 | Mitchell |
| 3,082,098 A | 3/1963 | Bergquist |
| 3,093,487 A | 6/1963 | Jones et al. |
| 3,114,645 A | 12/1963 | Blanken et al. |
| 3,170,804 A | 2/1965 | Kline et al. |
| 3,174,866 A | 3/1965 | Saperstein |
| 3,393,074 A | 7/1968 | Ehrlich |
| 3,720,253 A | 3/1973 | Ballas et al. |
| 3,778,425 A | 12/1973 | Kandatsu et al. |
| 3,881,034 A | 4/1975 | Levin |
| 3,956,521 A | 5/1976 | Pisecky |
| 4,279,932 A | 7/1981 | Koshida et al. |
| 5,164,217 A | 11/1992 | Wong et al. |
| 5,487,911 A | 1/1996 | Ueda et al. |
| 5,736,181 A | 4/1998 | Bezner et al. |
| 5,855,857 A | 1/1999 | Dithmer |
| 6,149,964 A | 11/2000 | Theuer et al. |
| 6,358,554 B1 | 3/2002 | Hagiwara et al. |
| 6,579,551 B1 | 6/2003 | Theuer et al. |
| 9,731,003 B2 | 8/2017 | Nadeau |
| 9,913,488 B2 | 3/2018 | Book et al. |
| 11,154,081 B1 | 10/2021 | Lele et al. |
| 11,154,082 B2 | 10/2021 | Lele et al. |
| 2004/0213885 A1 | 10/2004 | Bisson et al. |
| 2009/0220674 A1 | 9/2009 | Katz et al. |
| 2009/0238943 A1 | 9/2009 | Mukhopadhyay |
| 2009/0317516 A1 | 12/2009 | Newsteder |
| 2010/0255039 A1 | 10/2010 | Fritsche et al. |
| 2014/0234501 A1 | 8/2014 | Sant |
| 2015/0079233 A1 | 3/2015 | Calleja Araque et al. |
| 2015/0305394 A1* | 10/2015 | Mazer ................ A23P 10/22 426/61 |
| 2016/0338400 A1 | 11/2016 | Avital et al. |
| 2017/0056494 A1 | 3/2017 | Nadeau |

(Continued)

FOREIGN PATENT DOCUMENTS

| CN | 1033003 | 5/1989 |
|---|---|---|
| CN | 1086966 | 5/1994 |

(Continued)

OTHER PUBLICATIONS

English Translation for CN110122865 published Aug. 2019.*
Farooq. Study of Thermal and Hydrolytic Denaturation of Casein. 2019. Journal of Animal and Plant Sciences. 29(1). pp. 141-148.*
Nora. How to Bake a Cake in Microwave. Mar. 2021. https://violet.applebutterexpress.com/faq/how-to-bake-cake-in-microwave/.*
Dixon. How to Thaw a Gallon of Milk. 2020. https://www.thebestestever.com/thaw-gallon-of-milk.html.*
Percival. What is the Difference Between Fresh Milk and Powdered Milk? 2019. https://www.liquidline.co.uk/news/what-is-the-difference-between-fresh-milk-and-powdered-milk/.*
Loveday. 2016. International Dairy Journal 52. pp. 92-100.*
Effects on Physical and Functional Properties of Dried Whole Eggs of Cassava (Manihot Esculenta Crantz) Starch Additive and Corn Syrup Additive; Masilungan-Manuel, Joanna Tess, Sino CL, Jarin AV, Vera FC; In 4th International Conference on Biotechnology and Environment Management 2014 (vol. 75, p. 47); Lacsit Press, Singapore; http://www.ipcbee.com/vol75/008-ICBEM2014-S1001.pdf.

(Continued)

*Primary Examiner* — Anthony J Weier
(74) *Attorney, Agent, or Firm* — Gottlieb, Rackman & Reisman PC

(57) ABSTRACT

A milk food product is provided that when mixed with baby food and given regularly to a baby will reduce the likelihood of the baby developing a food allergy. The milk food product is produced by taking milk and mixing or whipping the milk with other ingredients such as rice, tapioca, wheat, corn, nut flours, soy flour, or bean flour. The resulting batter is then baked in order to produce a cake-like product. The resulting cake is then dried in order to remove substantially all moisture. The dried cake is then ground or milled into a powder.

16 Claims, No Drawings

(56) References Cited

U.S. PATENT DOCUMENTS

| | | | |
|---|---|---|---|
| 2017/0367362 | A1 | 12/2017 | Kreuss |
| 2018/0020712 | A1 | 1/2018 | Brown |
| 2018/0214494 | A1 | 1/2018 | Ohya et al. |
| 2019/0167577 | A1 | 6/2019 | Leitner et al. |
| 2019/0343162 | A1 | 11/2019 | Yepes et al. |
| 2020/0170262 | A1 | 6/2020 | Reed |
| 2020/0390133 | A1 | 12/2020 | Lele et al. |

FOREIGN PATENT DOCUMENTS

| | | | |
|---|---|---|---|
| CN | 1142915 | | 2/1997 |
| CN | 101690596 | | 4/2010 |
| CN | 102613482 | | 8/2012 |
| CN | 106165870 | | 11/2016 |
| CN | 107969617 | | 5/2018 |
| CN | 110122865 | * | 8/2019 |
| CN | 110122865 | A | 8/2019 |
| EP | 0038684 | B1 | 7/1984 |
| GB | 756643 | A | 9/1956 |
| WO | 2018/057926 | | 3/2018 |

OTHER PUBLICATIONS

Feeding babies egg and peanut may prevent food allergy; Imperial College, London, Science Daily; Sep. 20, 2016; https://www.sciencedaily.com/releases/2016/09/160920112328.htm.
Baked Milk- and Egg-Containing Diet in the Management of Milk and Egg Allergy; Leonard SA, Caubet JC, Kim JS, Groetch M, Nowak-Węgrzyn A.; The Journal of Allergy and Clinical Immunology: In Practice. Jan. 1, 2015;3(1): 13-23; https://www.sciencedirect.com/science/article/abs/pii/S2213219814004188.
Watson, E; "Lil Mixins makes early introduction of potential allergens easy for parents", [Retrieved from the internet on Feb. 25, 2020]; https://www. food navigator-usa .com/Article/20 18/08/27/lii-Mixins-makes-early-introduction-of-potential-allergens-easy-for-parents; p. 1. top and bottom; p. 2. picture and bottom: p. 3, top-middle; p. 4, top-middle; Aug. 27, 2018.
American Egg Board; Incredible Egg Cooking School—Soft Meringue; (The Incredible Egg) How to Make a Soft Meringue . . . Retrieved from: https:/www.incredibleegg.org/cooking-school/eggs-baking/make-soft-meringue/. Jun. 16, 2017.
Du Toit, et al.; Prevention of food allergy. J Allergy Clin Immunol.; London, United Kingsom; 137 (4). Apr. 2016.
International Search Report and Written Opinion, U.S. Patent and Trademark Office, corresponding Application No. PCT/US2020/023517, dated Jun. 18, 2020.
John Michaelides; Baker's Journal, A Primer on Preservatives, https://www.bakersjournal.com/a-primer-on-preservatives-6271/, Aug. 2015.
George N. Konstantinou, MD, MSC et al; Consumption of heat-treated egg by children allergic or sensitized to egg can affect the natural course of egg allergy . . . ; From the Allergy Department, Pediatric Hospital "P & A Kiriakou," National and Kapodistrian University of Athens, Athens, Greece. Letters to the Editor; Allergy Clin Immunol., Aug. 2008; pp. 414-415.
Stephanie A. Leonard MD et al; Dietary Baked Egg Accelerates Resolution of Egg Allergy in Children; J. Allergy Clini. Immunol., Aug. 2012; 130 [2] pp. 473-480.
Stephanie A. Leonard MD et al; Dietary Baked Egg Accelerates Resolution of Egg Allergy in Children; American Academy of Allergy, Asthma & Immunology; 2012 http://dx.doi.org/10.1016/j.jaci.2012.06.006.
Zoubida Akkouche et al.; Effect of Heat on Egg White Proteinsjnternational Conference on Applied Life Sciences (ICALS2012)/ISALS Turkey, Sep. 10-12, 2012.
Julie Wang, MD; Egg allergy: Clinical Features and Diagnosis—Wolters Kluwer; UpToDate; www.uptodate. com, Oct. 16, 2020.
Julie Wang, MD; Egg allergy: Management—UpToDate; Wolters Kluwer; UpToDate; www.uptodate.com, May 10, 2019.
Heather Lemon-Mule, MD; Immunologic changes in children with egg allergy ingesting extensively heated egg; [Food, drug, insect sting allergy, and anaphylaxis—Rapid Publication] American Academy of Allergy, Asthma & Immunology; doi:10.1016/j.jaci.2008.09.007; 2008.
Makiko Suzuki et al.; Lipocalin-Type Prostaglandin DSynthase and Egg White CystatinReact with IgE Antibodies fromChildren with Egg Allergy; Allergology International. 2010;59, No. 2: pp. 175-183.
Gustavo Martos, BS et al.; Mechanisms underlying differential food allergy response to heated egg; J Allergy Clin Immunol; vol. 127, No. 4; Apr. 2011; pp. 991-997.
Maresa Botha, MD.; Rural and urban food allergy prevalence from the South African Food Allergy; J Allergy Clin Immunol; vol. 143, No. 2; 2018 American Academy of Allergy, Asthma & Immunology https://doi.org/10.1016/jjaci.2018.07.023; pp. 662-668.
Rachel L. Peters, PhD; The prevalence of food allergy and other allergic diseases in early childhood in a population-based study; J Allergy Clin Immunol; vol. 140, No. 1; Available online May 14, 2017. http://dx.doi.org/10.1016/j.jaci.2017.02.019; pp. 145-153.
Dohlman et al;Tolerance to cooked egg in an egg allergic popuation; Allergy Net; Accepted for publication Feb. 19, 2006; Allergy 2006: 61:899-901.
Love and Lemons NPL, https://www.loveandlemons.com/wprm_print/46490, Jun. 2020.
Lee Funke; How to Bake Eggs in the Oven, https://fitfoodiefinds.com/how-to-bake-eggs-in-oven, Feb. 25, 2021.
Loveday. 2016. International Dairy Journal 52. pages 92-100.
Dian, Fang, Jiayue Sun, Di Cao, Yanfeng Tuo, Shujuan Jiang and Guangqing Mu, Experimental and Modeling Study of the Denaturation of Milk Protein by Heat Treatment, Korean Journal of Food Science of Animal Resources, 37(1): 44-51 (2017). (Year: 2017).
Roberto J. Rona, FFPH; The prevalence of food allergy—a meta-analysis. J Allergy Clin Immunol 2007; 2007 American Academy of Allergy, Asthma & Immunology; doi:10.1016/j.jaci.2007.05.026; Jul. 12, 2007; pp. 638-646.
International Search Report and Written Opinion, U.S. Patent and Trademark Office, Application No. PCT/US2020/014246, dated Apr. 20, 2020.
How to Make Powdered Eggs; http://tacticalintelligence.net/blog/how-to-make-powdered-eggs.htm Erich/Prepper Academy.
Eggs—Beating Techniques for Egg Whites; Sarah Phillips; CRAFTY BAKING.com;https://www.craftybaking.com/howto/eggs-beating-techniques-egg-whites.
What you need to know about your microwave's WATTAGE—http://www.superb1.ca/Microwave%20Tips/microwave.pdf—Accessible since Jan. 27, 2022 or earlier.

* cited by examiner

FOOD PRODUCTS FOR INFANTS AND BABIES AND METHOD OF MAKING SAME

CROSS-REFERENCE TO RELATED APPLICATION

This patent application is a continuation-in-part of non-provisional patent application Ser. No. 16/439,885, filed on Jun. 13, 2019, now U.S. Pat. No. 11,154,082, the disclosure of which is incorporated by reference herein in its entirety.

BACKGROUND OF THE INVENTION

As is known, food allergy rates have been on the rise over the last several years.

In 2015, the LEAP study was published showing that in high risk children, (even if they skin tested as already sensitized), you could reduce the rate of peanut allergy by 80% by feeding infants peanut protein regularly. These results were so striking, that in that same year, the American Academy of Pediatrics began recommending that all babies be fed peanuts regularly starting between 4 and 6 months old.

Subsequently, several studies and a subsequent meta-analysis have shown that that starting regular exposure of eggs between the ages of 4 and 6 months old can provide protection against egg allergy. The problem, however, is that babies cannot eat eggs or cooked eggs in their natural form at that young an age. They choke easily and typically require food in mush or slurry form.

Currently available in the marketplace is the product SpoonfulOne, which is a powder blend of small amounts of different food protein. These food proteins include peanuts, milk, eggs, almonds, soy, wheat, shrimp, cashews, hazelnuts, oat, cod, pecans, salmon, sesame, walnuts, and pistachios. Each daily serving has less than 1 gram total of 16 different proteins. SpoonfulOne is less than desirable since it does not provide a sufficient amount of protein as proven to reduce food allergy rates.

Inspired Start, a product that was formerly available in the market, consisted of a pouch of pear and egg containing 1 gram of egg protein. Each pouch was produced by puree-ing the desired protein with a very sweet fruit in order to create natural sweetness. The problem with Inspired Start was that it contained too much sugar.

Ready, Set, Food sells a powder in single serve packs which contains peanut, milk, and eggs.

Grocery alternatives include eggs, which must be cooked and prepared for a baby. Scrambled eggs are problematic since they clump, thereby providing a choking risk for a baby. Better preparation is to boil the eggs, and then puree the egg whites into food.

Also, egg powder may be used, which is either freeze-dried, spray dried, or drum dried. When mixed with water, egg powders turn into raw, uncooked egg which must then be prepared like a grocery egg.

Meringue powder, which is cooked meringue ground into a powder, is less than desirable because of the high sugar content too.

Cow's milk allergy is also one of the most common forms of food allergy, affecting around 1%-4% of young children in Western countries. IgE-mediated milk allergy is caused by an adverse immune reaction to one or more of the proteins in cow's milk. Most milk-allergic children (approximately 80%) outgrow the condition by the time of school age and develop clinical tolerance to cow's milk allergens.

The patterns of sensitization to individual cow's milk proteins varies significantly by study population and age. Approximately 61% of cow's milk reactive individuals are sensitized to the Bos d 5 (beta-lactoglobulin, otherwise indicated as "β-lactoglobulin") protein and approximately 57% are sensitized to the Bos d 11 (beta-casein, otherwise indicated as "β-casein") protein. These proteins represent two of the major allergens in milk and constitute approximately 9% and 26%, respectively, of total milk protein.

The observation in the art that children who consumed extensively heated (baked) milk products subsequently became tolerant to milk changed the paradigm for treatment of milk allergy. Consumption of baked milk products apparently accelerated the development of tolerance to milk and was associated with reduced IgE antibody responses to milk allergens. Indeed, approximately 70%-75% of children treated with baked milk products ultimately were able to tolerate such products.

Previous studies have investigated the effects of baking, following a specific recipe that includes: 1. Mixing pasteurized or raw milk with oil, flavoring and egg. 2. Mixing flour, sugar, salt and baking powder. 3. Adding the dry ingredients to the liquid ingredients and stirring. 4. Dividing the batter, and heating at 350 F for 30-35 minutes until firm to the touch.

A recent study using new monoclonal antibodies in order to measure the IgE-binding levels of Bos d 5 and Bos d 11 in milk products resulting from a muffin "baking" recipe showed that allergenic Bos d 5 was reduced from 680 µg/g in uncooked muffin mix to 0.17 µg/g in baked muffins, representing a greater than 99% decrease after baking. Conversely, allergenic Bos d 11 levels in baked muffins remained high and only decreased by 30% from a mean of 4249 µg/g in an uncooked muffin mix to 2961 µg/g when baked (~181 mg Bos d 11 per muffin). Significantly, baked muffins retained ~70% of the Bos d 11 IgE binding to uncooked muffin mix.

Baked muffin extract inhibited IgE binding to uncooked muffin mix by up to 80% in certain sections, demonstrating wide variability in retention of IgE reactivity.

Accordingly, it would be desirable to provide a milk food product that is specially created for babies in order to reduce the risk of developing food allergies. The product should contain a suitable quantity of food protein, and should not be overly processed so as to still retain the nutrients of the original foods. Additionally, the milk food product should have a minimal risk of choking and should have a markedly reduced chance of bacterial or fungal growth.

The need therefore exists for an infant safe well-cooked milk food product that can provide beneficial nutrients to infants as well as help them outgrow their allergenicity to milk-containing foods.

SUMMARY OF THE INVENTION

Generally speaking, in accordance the invention, a nutritional or dietary milk supplement or food product is provided that may be eaten by children or adults. The milk food product is made from cow's milk that is heat treated in order to selectively denature the allergenic proteins therein. This, in turn, substantially reduces the amount of micrograms of allergenic protein.

The inventive milk food product is produced by mixing or whipping the allergenic food with a starchy ingredient such as rice flour, tapioca flour, cassava flour, wheat flour, corn flour, nut flours, soy flour, or bean flour.

The resulting batter is then baked at a sufficient temperature for a sufficient time in order to produce a cake-like product. The resulting cake-like product is then dried in order to remove substantially all of the moisture (or water content) in it in order to produce a dried cake-like product. The dried cake-like product (or simply, the dried cake) is then ground or milled into a fine powder.

Accordingly, it is an object of the invention to provide an improved milk food product for infants or babies.

Another object of the invention is to provide a milk food product that has a sufficient amount of protein in its allergenic and denatured (or non-allergenic, or non IgE-binding) forms.

A further object of the invention is to provide a milk food product that is easy for an infant or baby to eat and digest.

Still other objects and advantages will be apparent from the following description.

DETAILED DESCRIPTION

Egg Food Product

The inventive process begins with selecting either whole eggs or egg whites. The eggs or egg whites may be raw, frozen or powdered (spray dried, drum dried or freeze dried). Powdered eggs or egg whites are first reconstituted into a liquid by mixing with water. Frozen eggs or egg whites are first defrosted.

The next step in the inventive process is to mix the eggs or egg whites. This is done by either whipping or stirring. Mixing may include adding one or more other ingredients. For example, the eggs or egg whites may be mixed with one or more of rice flour, tapioca flour, wheat flour, corn flour, nut flour, soy flour and bean flour. The weight ratio of the eggs or egg whites to the one or more other ingredient is from between 10:1 to 4:1.

An acid-containing food product such as lemon juice or white vinegar, or an acid-salt-containing food product such as cream of tartar may be added to the eggs or egg whites during mixing. This is done in order to stabilize the whipped or stirred eggs. The ratio of the eggs or egg whites to the added acid is between about ⅛ teaspoon per 30 g of egg.

Mixing by either whipping or stirring should take placed for a time period of between 1 and 10 minutes. The resulting meringue or batter is then baked in an oven or similar device for a period of time that is at least 10 minutes, more preferably at least 20 minutes, and even more preferably between 20 and 40 minutes and at a temperature that is at least 212 F, preferably 329 F, and even more preferably between 329 F and 400 F. The purpose of baking is to denature the ovalbumin and ovomucoid. The baking will produce a cake.

After baking, the resulting cake is dried in order to further reduce water content, preferably to a water content level in the cake of less than 10%. The now dried cake is ground or milled into a fine powder such that it can pass through a 200 mesh screen.

In use, the ground or milled egg powder is proportioned and fed to infants older than 4 months old by mixing the powder into breastmilk, formula, or developmentally-appropriate pureed foods. Suitable pureed foods include vegetables, fruits, yogurt, or wheat cereal. The baked egg powder of the invention is preferably fed to infants in serving sizes of about 0.5 grams to about 10 grams or more at a frequency of once per week to once daily so as to reduce the risk of allergic sensitization to eggs.

Alternatively, the ground or milled egg powder may be proportioned in servings containing a desired amount of protein. For example, the ground or milled egg powder may be analyzed in a laboratory to determine its protein content per gram of powder product. The protein content amount of the powder may be indicated in the packaging that is utilized to store, contain, sell, etc., the egg powder product such that a consumer can manually determine how much powder product to utilize based on the desired or preferred protein content per serving.

The powdered egg product produced in accordance with the invention is advantageous in that the correct amount of proteins per serving is provided in feeding to an infant. This is because the powder is uniform in nature and the protein content per gram is determined.

The powdered egg product produced in accordance with the invention is advantageous since it has good water absorption and water adhesion characteristics. This is because it is dried and can absorb water.

As a result, the powder is easily mixed into pureed food.

The powdered egg product produced in accordance with the invention is advantageous since the individual granules thereof do not adhere to each other. This is because the baking process creates a stable granule. As a result, the powder cannot form a gel or solid when mixed with water. This property prevents risk of choking an infant.

The powdered egg product produced in accordance with the invention is advantageous as it is specifically designed as an infant food product. This is because it is easily mixed into any age appropriate food and will not increase choking risk. As a result, it is appropriate to be fed to an infant who can tolerate solid food.

In an alternate embodiment of the present invention, the inventive process begins with obtaining a dehydrated egg food product. The dehydrated egg food product may have been produced by, for example, spray drying, drum drying or freeze drying whole eggs, egg whites, or a mixture of whole eggs and egg whites. The dehydrated egg food product in this step may be, for example, an egg food product in powder form (or in granules that are greater in size than "powder" granules, for example granules up to about 2 mm in size), an egg food product in the form of flakes, etc., or a mixture of such foods.

As an example, the first step in the alternate embodiment may include obtaining commercially available egg powder, egg flakes, or a mixture of the two. The commercially available egg powder and/or flakes should be derived from whole eggs, egg whites or a mixture of whole eggs and egg whites. The egg flakes may optionally be grounded or milled down to a smaller size, for example, to granules about 3 mm in size or smaller.

The dehydrated egg food product obtained in the first step of the alternate embodiment will likely contain high levels of allergenic ovalbumin and ovomucoid proteins. For this reason, it is likely unsafe to be fed to infants of four months of age or older, to older children, and to adults who are sensitive to these proteins.

In the alternate embodiment, the second step is to heat the dehydrated egg food product at a temperature ranging from about 212 F to about 400 F for a time period ranging from about 2 minutes to about 20 minutes. For example, the second step may include inserting the dehydrated egg food product in a heating chamber (or baking chamber) heated to a temperature in the range from about 212 F to about 400 F for about 2 to about 20 minutes. This will toast the dehydrated egg food product.

The toasting step will denature the allergenic ovalbumin and allergenic ovomucoid proteins in the dehydrated egg food product to a level that renders the toasted egg food product safe for consumption by infants as young as four months of age or older. In other words, the amount of allergenic (e.g., non-denatured) ovalbumin protein and the amount of allergenic ovomucoid protein that remains in the egg food product after the toasting step is low enough such that the toasted egg food product can be safely fed to infants and adults.

The dehydrated egg food product may be constantly or intermittently mixed in order to distribute the heat more evenly through the dehydrated food product.

Milk Food Product

The inventive process begins with raw or pasteurized cow's milk. The raw or pasteurized cow's milk may be liquid, frozen or powdered (e.g., spray dried, drum dried or freeze dried milk powder). When commencing with powdered milk, the powdered milk would first be reconstituted into liquid form by mixing it with water. When starting with frozen milk, the frozen milk would first be thawed.

The next step in the inventive process is to mix the liquid cow's milk with a starch. The starch may include, for example, one or more of rice flour, tapioca flour, wheat flour, corn flour, nut flour, soy flour and bean flour. The milk and the starch (e.g., flour) can be mixed by whipping and/or stirring the ingredients with one another. The starch can also be a mixture of two or more different kinds of flours. The weight ratio of the milk to the starch (or mixture of flours) ranges from about 1:1 to about 2:3.

While the starch is described as being provided in a flour form, the size of the individual particles that make up the starch material need not necessarily be the same size as that of "flour." While the starch material should be provided in a grounded/milled form, a size of the individual grounded/milled particles of the starch material can vary, for example, from about 10 micrometers (e.g., the size of finely grounded wheat flour particles) to a significantly coarser size of no more than 400 micrometers (e.g., to about the size of corn grits that are used to make polenta).

The step of mixing the milk with the starch is achieved by whipping or stirring, which should take place for a time period ranging from about 1 to about 10 minutes, until a smooth, consistent batter is achieved. The resulting batter is then heated for a period of time that is at least 10 minutes, more preferably at least 20 minutes, and even more preferably between 20 and 40 minutes and at a temperature that is at least 212 F, preferably 329 F, and even more preferably between 329F and 400F. The purpose of the heating process is to denature the bos d 5 and bos d 11 proteins in the milk. Heating the batter at the temperature range and for the time period described above may denature up to 99% of the allergenic bos d 5 protein content of the milk component of the batter and up to about 99% of the allergenic bos d 11 protein content of the milk component of the batter.

The heating process may be carried out, for example, by baking the batter in an oven or similar device for a period of time that is at least 10 minutes, more preferably at least 20 minutes, and even more preferably between 20 and 40 minutes and at a temperature that is at least 212 F, preferably 329 F, and even more preferably between 329 F and 400 F. This will produce a cake.

After the heating process, the resulting cake may be dried in order to further reduce its water content. The cake may be dried, for example, by dehydration in an oven or similar device for a period of time ranging from about 20 minutes to about 12 hours and at a temperature ranging from about 100 F to about 140 F. The drying process may reduce the water content of the cake to a range of about 3% to about 10%.

The dried cake is then ground or milled into a fine powder having particle sizes ranging from about a 60 mesh size to about a 200 mesh size (U.S. standard mesh sizes). Smaller cake particle sizes are preferred, for example, particles in the size of about 200 mesh.

In use, the ground or milled milk powder (or powdered milk product) may be proportioned in servings containing a desired amount of protein and may be fed to infants as young as four months old and to adults at a certain frequency. In use, the ground or milled powdered milk product is proportioned and fed to infants older than 4 months old by mixing the powder into breastmilk, formula, or developmentally-appropriate pureed foods. Suitable pureed foods include vegetables, fruits, yogurt, or wheat cereal. The powdered milk product of the invention is preferably fed to infants in serving sizes of about 0.5 grams to about 10 grams or more at a frequency of once per week to once daily so as to reduce the risk of allergic sensitization to cow's milk.

Alternatively, the ground or milled milk powder may be analyzed in a laboratory to determine its protein content per gram of powder product. The protein content amount of the powder may be indicated in the packaging that is utilized to store, contain, sell, etc., the milk powder product such that a consumer can manually determine how much powder product to utilize based on the desired or preferred protein content per serving.

After determining the amount of powdered milk product to utilize, a user may obtain the powdered milk product and mix it into breastmilk, formula, or developmentally-appropriate pureed food.

The powdered milk product produced in accordance with the invention is advantageous in that the correct amount of total and allergenic proteins per serving is provided. This is so because the powder is uniform in nature and the protein content (both total and allergenic) per gram is determined (e.g., by performing a protein analysis on the powder milk product as known to those skilled in the art). Therefore, equal rations (or equal doses) of milk powder product produced in accordance with the present invention and derived from the same batch will have virtually the same protein content as one another.

The powdered milk product produced in accordance with the invention is advantageous because it has good water absorption and water adhesion characteristics. This is so because the product is provided in a dry powder form and can readily absorb water.

The powdered milk product produced in accordance with the invention is advantageous because the individual granules (or particles) thereof have do not adhere to one another. This is so because the baking process creates stable granules. As a result, the granules are not likely to clump into a gelatinous mass or into a solid mass of material when mixed with water, and/or pureed foods. This property of the powdered milk product produced according to the present invention prevents the risk of choking an infant.

In an alternate embodiment of the present invention, the inventive process begins with obtaining a dehydrated cow's milk food product. The dehydrated cow's milk food product may have been derived, for example, by obtaining raw or pasteurized cow's milk and drying/dehydrating the cow's milk by using conventional food processing steps. For example, the dehydrated cow's milk food product obtained in this step may be powdered milk (e.g., commercially available milk powder).

The dehydrated cow's milk food product obtained in the first step of the alternate embodiment will likely contain high levels of allergenic bos d 5 and bos d 11 proteins. For this reason, it is likely unsafe to be fed to infants of four months of age or older, to older children, and to adults who are sensitive to these proteins.

In the alternate embodiment, the second step is to heat the dehydrated cow's milk food product at a temperature ranging from about 212 F to about 400 F for a time period ranging from about 2 minutes to about 20 minutes. For example, the second step may include inserting the dehydrated cow's milk food product in a heating chamber (or baking chamber) heated to a temperature in the range from about 212 F to about 400 F for about 2 to about 20 minutes. This will toast the dehydrated cow's milk food product.

The toasting step will denature the allergenic bos d 5 and allergenic bos d 11 ovomucoid proteins in the dehydrated cow's milk food product to a level that renders the toasted food product safe for consumption by infants as young as four months of age or older. In other words, the amount of allergenic (e.g., non-denatured) bos d 5 protein and the amount of allergenic bos d 11 protein that remains in the cow's milk food product after the toasting step is low enough such that the toasted cow's milk food product can be safely fed to infants and adults.

The dehydrated cow's milk food product may be constantly or intermittently mixed during the toasting step in order to distribute the heat more evenly through the dehydrated food product.

The scope of the invention will now be set forth in the following claims.

What is claimed is:

1. A method of producing an infant or baby food product comprising:
    mixing cow's milk in liquid form with a starch in order to produce a batter;
    heating the batter at a temperature ranging from about 212 F to about 400 F for a time period ranging from about 10 minutes to about 40 minutes in order to produce a cake, wherein the heating process denatures at least one milk protein in the cake;
    drying the cake; and
    grinding or milling the dried cake into a powder,
    wherein a weight ratio of the cow's milk to the starch ranges from about 1:1 to about 2:3.

2. The method of claim 1, wherein the starch is at least one flour selected from the group consisting of rice flour, tapioca flour, wheat flour, corn flour, nut flour, soy flour and bean flour.

3. The method of claim 1, wherein the mixing step is carried out by either whipping or stifling.

4. The method of claim 1, wherein the cake is dried to a water content in the range of about 3% to about 10%.

5. The method of claim 1, wherein the cow's milk is raw or pasteurized.

6. The method of claim 1, wherein the cow's milk in liquid form is prepared using frozen cow's milk that is allowed to thaw prior to said mixing step.

7. The method of claim 1, wherein the cow's milk in liquid form is prepared using powdered cow's milk that is first mixed with water prior to said mixing step.

8. The method of claim 1, wherein the cow's milk component of the batter includes allergenic bos d 5 (beta-lactoglobulin) protein and allergenic bos d 11 (beta-casein) protein, and
    wherein the heating process denatures up to 99% of the allergenic bos d 5 protein content of the cow's milk component of the batter and up to about 99% of the allergenic bos d 11 protein content of the cow's milk component of the batter.

9. The method of claim 1, wherein the grinding or milling process results in the powder having granules in a size ranging from about 60 mesh to about 200 mesh.

10. The food product produced by the method of claim 1.

11. The food product produced by the method of claim 9.

12. A method for reducing the risk of developing a food allergy to milk, the method comprising preparing a food product in accordance with the steps of claim 1 and feeding said food product to a baby or infant of an age of at least four months old.

13. The method of claim 12, further including mixing the powdered food product into a pureed food prior to the feeding step.

14. The method of claim 12, wherein the feeding step is carried out in serving sizes of about 0.5 to 10 grams of the powdered food product and at a frequency of 1-7 times per week.

15. The method of claim 12, wherein the preparing step includes heating the batter at a temperature ranging from about 212 F to about 400 F for a time period ranging from about 10 minutes to about 40 minutes and drying the cake to a water content of about 3% to about 10%.

16. The method of claim 15, wherein the preparing step further includes grinding or milling the dried cake into a powder of a size ranging from about 60 mesh to about 200 mesh.

* * * * *